United States Patent

Rucker

[15] 3,662,285

[45] May 9, 1972

[54] MICROWAVE TRANSDUCER AND COUPLING NETWORK

[72] Inventor: Charles T. Rucker, Clearwater, Fla.

[73] Assignee: Sperry Rand Corporation

[22] Filed: Dec. 1, 1970

[21] Appl. No.: 94,046

[52] U.S. Cl. ..............................331/107 R, 331/56, 331/96, 333/9

[51] Int. Cl. ..............................H03b 7/14

[58] Field of Search ..............................331/56, 96, 107; 333/9

[56] References Cited

UNITED STATES PATENTS

| | | | |
|---|---|---|---|
| 3,189,843 | 6/1965 | Bruck | 331/107 T |
| 3,252,112 | 5/1966 | Haver | 331/56 |
| 3,320,550 | 5/1967 | Gerlach | 331/107 T |
| 3,378,789 | 4/1968 | Gerlach | 331/56 |
| 3,521,194 | 7/1970 | Lowe | 331/107 T |
| 3,582,813 | 6/1971 | Hines | 331/156 |

*Primary Examiner*—John Kominski
*Attorney*—S. C. Yeaton

[57] ABSTRACT

An active semiconductor array coupled to high frequency fields supported by a symmetric passive array of radial transmission line elements serves as a high frequency transducer for amplifying the high frequency fields. The radial transmission line configuration achieves stable low-loss combining power from the individual diodes of the diode array and permits coupling of the several passive circuits to a common output with suppression of undesired oscillation modes.

11 Claims, 4 Drawing Figures

INVENTOR.

CHARLES T. RUCKER

BY

HP Terry

ATTORNEY

INVENTOR.
CHARLES T. RUCKER
BY
HP Terry
ATTORNEY

INVENTOR.
CHARLES T. RUCKER
BY
ATTORNEY

MICROWAVE TRANSDUCER AND COUPLING NETWORK

CROSS REFERENCE TO RELATED APPLICATION

Copending U.S. Pat. application Ser. No. 853,725, in the names of C. T. Rucker and J. W. Amoss and entitled "Microwave Negative Resistance Transducer" was filed Aug. 28, 1969, and is assigned to the Sperry Rand Corporation. Patent application Ser. No. 853,725, which issued as U.S. Pat. No. 3,605,034 Sept. 14, 1971, describes and claims high frequency transducer devices of the general kind described in the present application.

BACKGROUND OF THE INVENTION

1. Field of the Invention

The invention pertains to means for the generation or amplification of desired high frequency or microwave oscillations in association with passive transmission line circuits and more particularly relates to the efficient and broad band generation or amplification of such electrical signals without concurrent generation of spurious signals, all by the use of an array of active semiconductor devices.

2. Description of the Prior Art

Generally, prior art semiconductor negative resistance high frequency energy transducers, including amplifiers and oscillators, share the fault of relatively low output power capability. Accordingly, many efforts have been made to combine a plurality of the primary energy sources of such transducers for the supply of higher power oscillations. For example, one common approach to the problem has been to combine the outputs of a plurality of independent oscillators by using hybrid or other transmission line network devices such as provide isolation between the individual oscillators. If the number N of oscillators whose outputs are to be combined is large, the losses in such combining circuits become so great that a point of diminished return in output power is soon reached. Such combining networks can also become large, complex, expensive, and difficult to adjust satisfactorily.

A second solution more recently considered involves closely connecting the primary energy sources in series, parallel, or series-parallel relation by short transmission lines or other conductors. In such arrangements, however, multiple heat sources are located in close proximity and problems of cooling them are generally impractical of solution.

Prior art high frequency and microwave energy transducer devices also generally show serious disadvantages because multiple resonant conditions can be inherent where the primary energy sources whose outputs are to be combined are connected by transmission lines or other conductors of lengths that are appreciable fractions of a quarter of the operation wave length. For example, if N such primary energy sources are connected in parallel relation, there are N-1 potentially stable undesired modes of oscillation, whereas unconditionally stable and efficient oscillation at a single oscillating frequency is actually desired.

Prior art high frequency negative resistance energy transducers have commonly demonstrated an additional fault since the negative resistance semiconductor devices used as primary energy sources therein have relatively low negative resistances of only a few ohms. Thus, to make effective use of such negative resistance devices, complex impedance transformation systems have been required in the associated passive circuits. The problem is compounded when higher output power levels are sought, as when several primary energy sources are, for instance, to be placed electrically in parallel and their outputs are to be efficiently supplied to a common load.

SUMMARY OF THE INVENTION

The present invention concerns a symmetric active semiconductor circuit which operates efficiently as an oscillator or as an amplifier of high frequency or microwave carrier signals. The apparatus employs an array of active semiconductor elements closely coupled to high frequency fields associated with a symmetric array of cooperating power combining radial transmission lines. The power combining circuit comprises an integral part of the transducer and permits sufficient separation between the active semiconductor elements to permit effective cooling of the active elements. The combining network permits stable low-loss combining of the individual power contributions made by each semiconductor element of the array, permits coupling of the several passive circuits formed by the radial transmission lines to a common output, and affords stability and efficient operation through suppression of undesirable oscillation modes. The combining network of radial transmission lines permits operation over a broad band of frequencies with low internal losses.

DESCRIPTION OF THE PREFERRED EMBODIMENT

Figure 1:
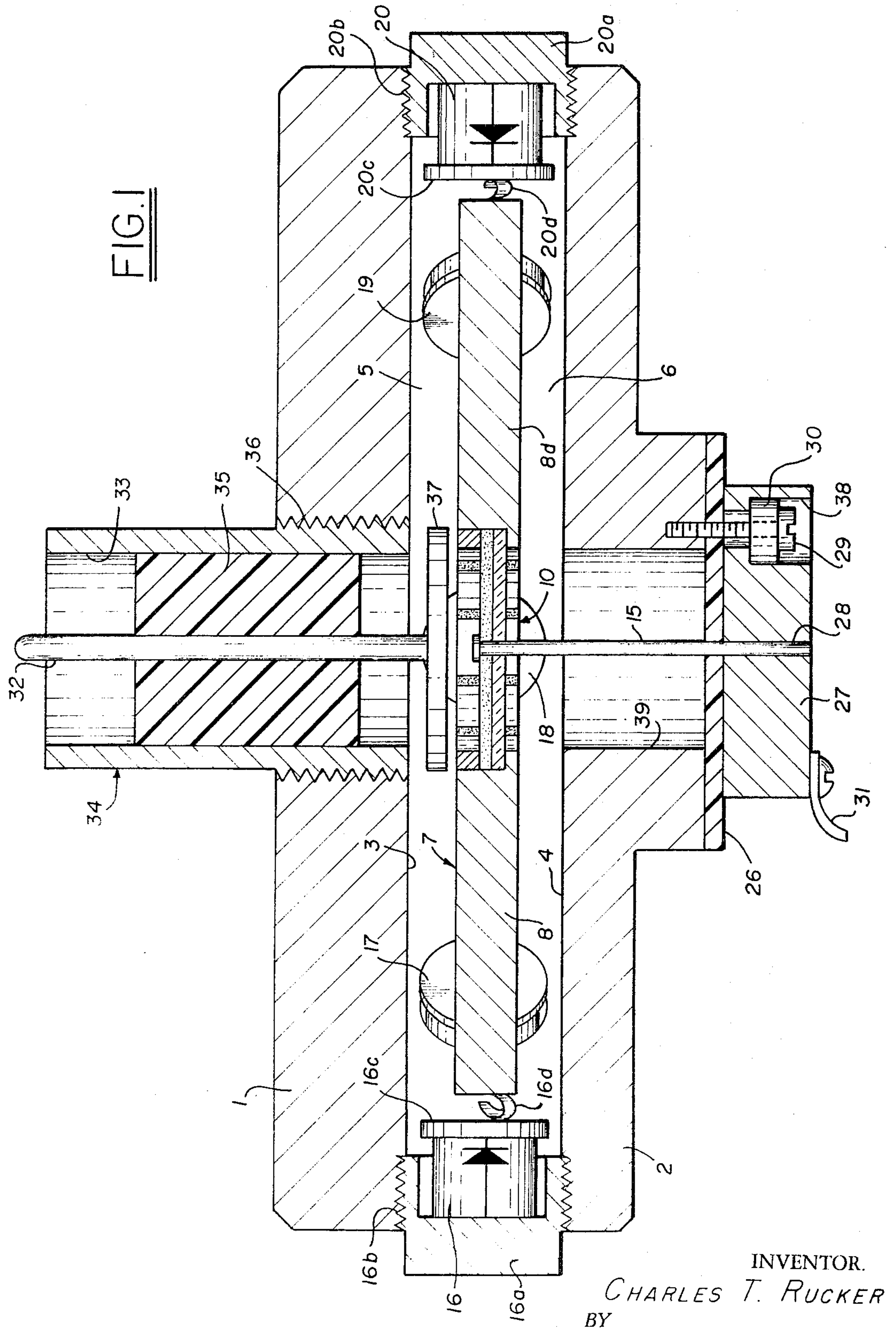
FIG. 1 is an elevation cross section view of a preferred embodiment of the invention.
Figure 2:
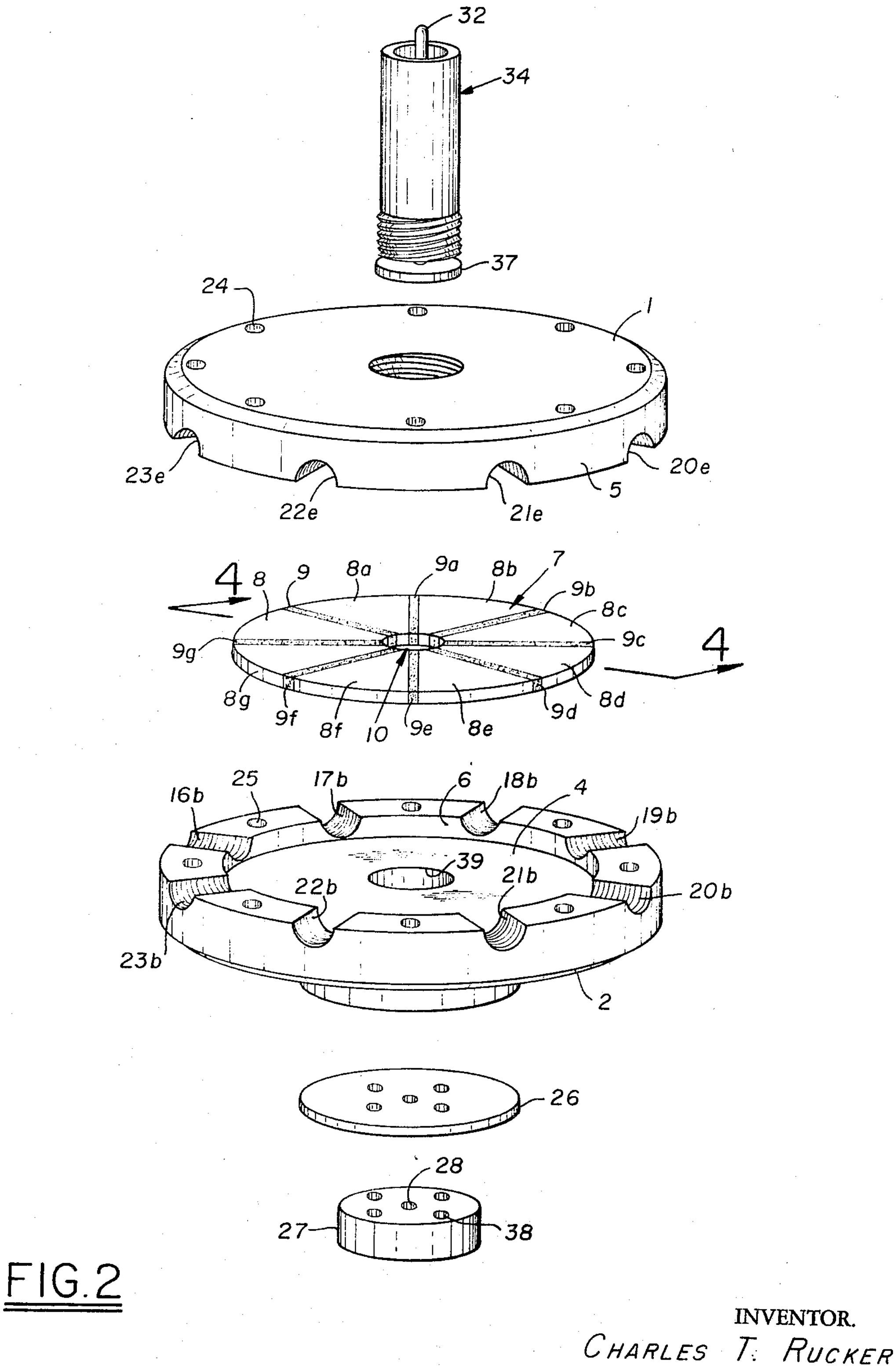
FIG. 2 is an exploded view of parts of the apparatus of FIG. 1.

Referring to FIGS. 1 and 2, it is seen that elements of the novel high frequency transducer device are contained in a casing comprising major casing elements 1 and 2. As is seen particularly in FIG. 2, the casing element 1 is a circular disk with a peripheral annular flange or extension 5. Likewise, casing element 2 is a disk having a similar peripheral annular flange or extension 6. Casing elements 1 and 2 are respectively provided with a plurality of fastening holes, such as holes 24 and 25 drilled through the disks and their respective flange portions 5 and 6. The circular arrays of holes including holes 24 and 25 permit the casing elements 1 and 2 to be fastened together in a conventional manner by screws or by other such fasteners. The inner cylindrical surfaces 3 and 4 of the respective casing elements 1 and 2 are composed of material adapted to conduct high frequency currents with minimum ohmic loss, as are all interior high frequency current carrying walls of the apparatus.

Figure 4:
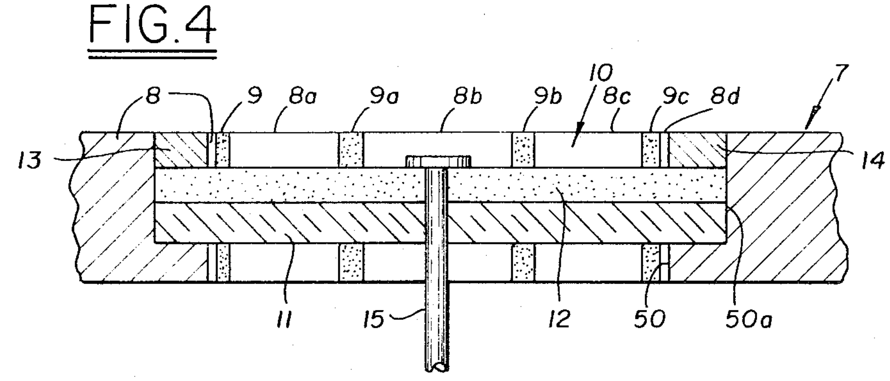
FIG. 4 is an enlarged view in cross section of a portion of the apparatus of FIG. 1.

As seen in FIGS. 1, 2, and 4, the interior of casing elements 1 and 2 has located centrally therein a flat disk element 7 as seen particularly in FIG. 2. Disk element 7 comprises a plurality of current conductive sectors 8, 8*a*, 8*b*, 8*c*, 8*d*, 8*e*, 8*f*, and 8*g*. Each sector of disk 7 is composed of material highly conductive for high frequency currents or at least has highly current conductive surface characteristics. The several sectors 8 through 8*g* are substantially equal in angular extension and are electrically insulated from each other. For example, the adjacent conducting sectors 8 and 8*a* are separated by an insulating bar 9 extending along a radius of disk 7. Similarly, sector 8*a* is separated from sector 8*b* by an insulating bar 9*a*. Similar radially aligned insulating separator bars are provided for all adjacent conducting sectors for the remainder of the structure of disk 7, including a radially aligned insulating bar 9*f* which separates the adjacent conductive sectors 8*f* and 8*g*.

The structure of disk 7 may be fabricated in any conventional manner. For example, the individual conducting sectors 8 to 8*g* may be assembled in a jig and the insulating bars 9 to 9*f* may be formed by injection of a solidifiable liquid plastic material which tends to form an adhesive bond between and to separate adjacent conducting sectors. For instance, the insulating radial bar 9 may be formed in such a manner that it adheres to adjacent surfaces of conducting sectors 8 and 8*a* in a manner readily providing a mechanically rigid structure.

As seen more clearly in FIGS. 1 and 4, there is supplied at the center of the disk structure 7 an aperture 50 for accommodating a planar or disk resistor device 10. The planar or disk resistor structure 10 resides in a portion 50*a* of aperture 50 slightly enlarged with respect to aperture 50. The disk resistor 10 may comprise two circular components mutually bonded together; these are the circular glass substrate 11, which may be composed of other materials such as a ceramic material, supporting a planar layer 12 of resistive material. The resistive layer 12 may be applied by any of several well known techniques, such as by distillation of a metal in vacuum, by sputtering, or by chemical deposition. Ordinarily, layer 12 will comprise a relatively thin layer of chromium or other similar metal. Its thickness is dictated, in part, by the need to provide a planar resistive layer of a thickness greater than the skin depth at the operating wave length of the high frequency transducer. It will be understood by those skilled in the art that FIGS. 1 and 4 are purposely drawn with distorted dimensions in order more clearly to illustrate the invention. Accordingly, it is understood that the thickness of the resistive layer 12 is generally much less than the thickness of the substrate 11.

Referring again to FIGS. 1 and 4, the inner ends of the radial insulator bars 9 to 9*g* of FIG. 2 are seen. For example, the inner surface of insulating bar 9 is seen separating the inner surfaces of the conducting sectors 8 and 8*a*, the inner surface of insulating bar 9*a* is seen separating the inner surfaces of conducting sectors 8*a* and 8*b*, and so on. It will be understood that the various conducting sectors, including the sectors 8, 8*a*, 8*b*, 8*c*, and 8*d* seen in FIG. 4, are each arranged to be in high frequency current conducting contact with the resistive layer 12, the substrate 11 and layer 12 being held for this purpose, for example, by a plurality of arcuate conducting inserts, such as inserts 13 and 14. Thus, high frequency currents may readily flow relative to the resistive layer 12 radially along the surfaces of the several conducting sectors 8 through 8*g*.

Referring now particularly to FIGS. 1 and 2, it is seen in the example illustrated, that the cooperating peripheral flanges 5 and 6 of the respective casing portions 1 and 2 are respectively provided with arcuate cut-away half cylinder portions 16*e*, 17*e*, 18*e*, 19*e*, 20*e*, 21*e*, 22*e*, and 23*e*, and cooperating cut-away portions 16*b*, 17*b*, 18*b*, 19*b*, 20*b*, 21*b*, 22*b*, and 23*b*. When casings 1 and 2 are fastened together with flange portions 5 and 6 in mating relation, it is seen that the associated cut-away portions, such as portions 23*e* and 23*b*, form cylindrical holes with radially aligned axes. When the casing portions 1 and 2 are bonded together, the cylindrical holes thus formed, as seen in FIG. 1, are each capable of accommodating holders for active semiconductor elements, for example, such as holders 16*a* and 20*a* of FIG. 1. Holders such as the respective holders 16*a* and 20*a* may be held within the aforementioned cylindrical radial holes by threads such as illustrated respectively at 16*b* and 20*b* in FIG. 1, or may otherwise simply be bonded in the respective cylindrical radial holes by solder or conductive cement, as is suggested by the fact that the cutout portions 16*b* to 23*b* as illustrated in FIG. 2 lack threads.

Each semiconductor holder device, such as holders 16*a* and 20*a*, is provided with a semiconductor diode such as the diodes 16, 17, 18, 19, and 20 seen in FIG. 1. These diodes, such as diode 16, may be fastened within the associated electrical conducting holder 16*a* by a threaded fastener (not shown) or by other well known means such as by the employment of an electrically conductive adhesive placed on the interface, for example, between diode 16 and holder 16*a*. A conductive connection is made between each such diode and a particular conductive sector of the disk 7. The semiconductor diodes 16 to 23 may be current stable negative resistance elements or devices such as avalanche transit time negative resistance diodes. On the other hand, it will be understood that the novel high frequency transducer may readily be arranged to use voltage stable primary energy sources such as the Gunn diode or tunnel diode, both of which exhibit negative conductance properties.

Referring particularly to FIG. 1, a simple coiled leaf spring contactor 16*d* attached centrally to the outer periphery of conductive sector 8 of disk 7, forms by virtue of its spring characteristic, a firm electrical contact with the surface 16*c* of diode 16. The other diodes, such as the diodes 17 to 20 illustrated in FIG. 1, have similar spring contact elements. Each such spring contactor makes electrical contact with only one of the conducting sectors 8 to 8*g* of disk 7. For example, the surface 20*c* of diode 20 is contacted firmly by spring contactor 20*d* attached to the peripheral surface of conducting sector 8*d* of disk 7.

A bias voltage may be applied, as seen in FIGS. 1 and 4, to each of the respective diodes, such as to diodes 16 to 20, by the axial electrical conductor 15 located centrally in aperture 39, in turn centrally located in casing element 2. The surfaces of the cooperating elements 15 and 39 are again suitable for conducting high frequency currents with little loss of energy. So that a bias voltage may be applied to central conductor 15, the latter is supported in an insulated manner from casing portion 2. Such insulation is particularly provided by dielectric disk 26 through which the central conductor 15 passes into the bias cap 27. Bias cap 27 is provided with a bore 28 within which the outer end of the central conductor 15 is fastened, as by soldering Bias cap 27 is fixed in position in relation to case portion 2 by screws, such as screw 29, which is seen to be depressed in a bore 38 and to be insulated from bias cap 27 by an insulating washer 30. It is to be understood that coaxial conductors 15 and 39 form, in cooperation with bias cap 28, a shorted high impedance coaxial transmission line which is one quarter wave long at the operating frequency of the high frequency transducer.

A terminal 31 is provided for the convenient application of an appropriate bias voltage such as may be supplied by a bias battery (not shown) or other source of electrical voltage. The other side of the battery may be connected to the exterior of the casing of the transducer, such as to any part of casing portions 1 and 2 above the plane of the insulating disk 26. It is seen that bias currents may readily flow along axial conductor 15, radially within the resistive layer 12, radially along each of the several sectors 8 through 8*g* of disk 7, through their associated diodes 16 through 23, and thence back to the bias battery through the casing. For this purpose, it is seen that axial conductor 15 extends through substrate 11 and the resistive layer 12, being fastened in electrically conductive relation with layer 12.

For the electrical coupling of the several conducting sectors 8 to 8*g* of disk 7 to each other and for supplying high frequency energy input or output means, a transmission line system 34 is located on the axis of symmetry of the transducer. Transmission line 34 comprises coaxially aligned conductors having high frequency energy conducting surfaces 32 and 33 arrayed in coaxial relation. Transmission line 34 is fastened centrally in an aperture in casing portion 1 by threads 36 and the conducting surfaces 32 and 33 are fixed in coaxial alignment by dielectric bead 35. Within the interior 1 of the transducer, and in closely spaced relation to the resistive disk system 10, a capacitive coupling disk 37 is fastened at its center to the surface 32 of the inner conductor of transmission line 34. Adjustment of the degree of coupling of capacitive disk 37 to the circuit may be effected by variation of the spacing between disk 37 and resistive layer 12. Such may be accomplished with reasonable effectiveness by rotation of coaxial transmission line 34 relative to casing portion 1 by virtue of the presence of threads 36. Other more sophisticated means for accomplishing such translatory adjustment are well known in the art and do not necessarily form an essential part of the present invention.

The coupling disk 37 provides energy combining means for forcing phase-locking of the individual diodes 16 to 23 and their associated circuits. Disk 37 provides important cross-coupling of the fields produced by the individual diodes 16 to 23, in addition to coupling the combined output to transmission line 34, in such a manner that the load tends equally to share all of the diodes 16 to 23.

When the effective reactance to the negative resistance diode and that of the passive circuit plus the load are properly related, as well as the negative resistance of the diode and the resistance of the associated passive circuit including the load, the apparatus operates in the preferred mode as a stable oscillator, and energy is extracted from it by coupling a transmission line (not shown) directly to transmission line 34. With the reactance of the negative resistance device substantially equal to that of the associated passive circuit including the load, and with the absolute value of the negative resistance of the diode less than the resistance of the associated passive circuit including the load, stable amplification may be accomplished. For this purpose, a high frequency signal circulator is coupled in the conventional manner to transmission line 34 so that input signals to be amplified and the amplified output signals may conveniently be kept separate.

In operation, it is noted that, at any one instant of time, high frequency currents may flow radially away from the axis of the transducer in the same sense along both of the respective surfaces 3 and 4 of casing portions 1 and 2, through the assembly of diodes 18 through 23, in parallel through the various corresponding springs **18*a* through 23*a*, and then radially toward the top and bottom surfaces of conducting sectors 8 through 8*g*, thus flowing back to the general vicinity of the axis of the transducer structure. At the next half cycle, current flow is reversed. It is seen that the conducting sectors 8 through 8*g* act individually, in cooperation with conducting surfaces 3 and 4**, as shielded radial transmission lines.

It is seen that the novel high frequency transducer employs a partitioned array of planar radial transmission lines to achieve, in a simple manner, the necessary impedance transformation between diodes 18 through 23 and the associated passive circuits of the transducer, at the same time providing suppression of undesired modes of oscillation. For the latter purpose, resistive film 12 is located in such a manner that currents characteristic of any of the N-1 undesired modes would suffer severe ohmic losses should they build up in film 12, while currents of the desired mode are not attenuated in any substantial degree, film 12 being located where there is substantially no high frequency current flow in the desired mode. Film 12 may also play an additional role in aiding in determining the level of bias current flow through diodes 18 through 23.

Because of their geometry, the radial transmission lines represented by conductive sectors 8 through **8*g* each have a smoothly decreasing characteristic impedance with increasing radius (at increasing distances from the axis of the structure), allowing the placement of an array of many low impedance negative resistance diodes around the circumference of the radial transmission line disk 7. Simultaneously, the character of the radial lines permits that an optimum large load impedance can be, in effect, placed at or near the axis of the structure adjacent disk 7. If the disk 7 is composed of N radial transmission lines or sectors, and with the circumference of the single resistive layer 12 being conductively attached at the apices of each sector, there results the structure of FIGS. 1, 2, 4**, wherein N equals eight. It will be understood that other values of N are entirely feasible, and that the choice of $N=8$ has been made purely by way of offering a specific example of the structure of the novel transducer. For example, a further embodiment of the invention which may readily be demonstrated is one in which $N=2$.

Figure 3:
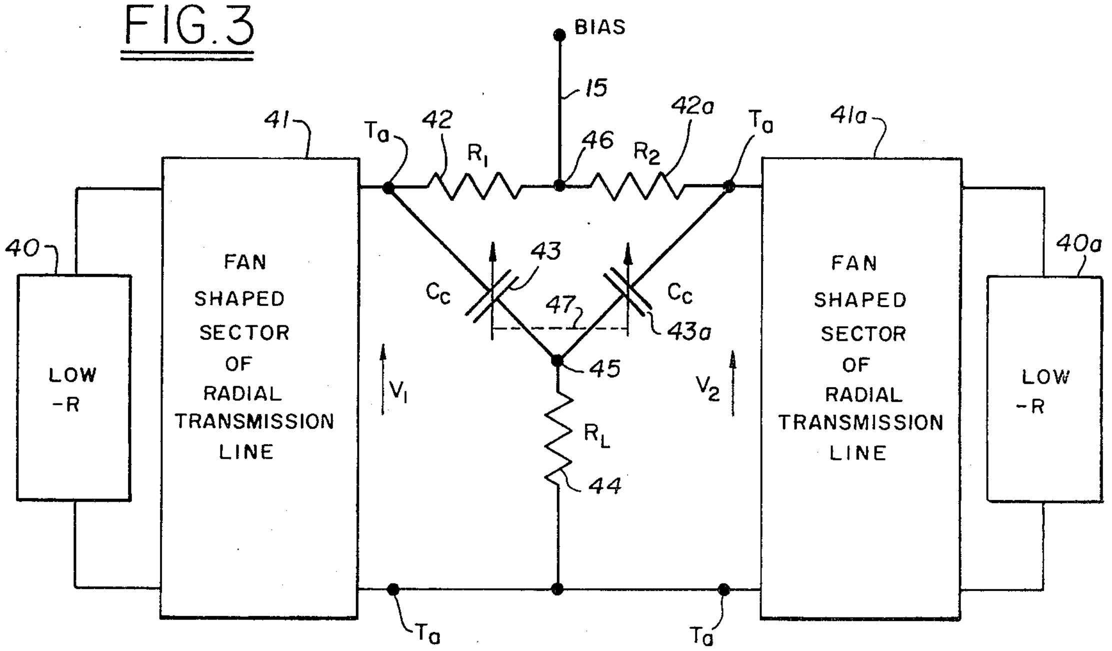
FIG. 3 is a circuit diagram useful in explaining the operation of the apparatus of FIG. 1.

For the purposes of examining the theory of operation of the invention, FIG. 3 is presented as representative of the relatively simple situation wherein $N=2$. In FIG. 2, elements 40, **40*a* represent the respective low negative resistances of the two active diodes which would be present in the assumed configuration. Elements 41 and 41*a* represent the two associated radial transmission line sectors. It is seen that the respective low negative resistances $-R$ are transformed to a much higher value $-R'$ in the plane of terminals $T_a$. This transformation has both broad band and low-loss characteristics because of the special impedance characteristics of the radial transmission line sectors 41, 41*a*. It is recognized that the load impedance $R_L$, represented by resistor 44**, usually has a predetermined value fixed according to the needs of a particular application of the transducer, a value which in most cases will be much lower than the total negative resistance $-R_T$:

$$-R_T=-R'/N$$

The coupling lumped capacitances $C_c$, represented by capacitors 43 and **43*a* share, in common, adjustability determined by change of the spacing between output coupling disk 37 and resistive layer 12. Such adjustability is represented by linkage 47, which is ordinarily set to provide maximum coupling between negative resistance $-R_T$ and the load resistance $R_L$ represented by resistor 44. The series resistors 42 and 42*a* represent the equivalent circuit for the resistive layer 12 for the case $N=2$. When operating in the desired mode only, the voltages $V_1$ and $V_2$ indicated in FIG. 3 in the planes of terminals $T_a$ are equal and in phase; resulting in substantially zero flow into resistive layer 12. A similar but more complex analysis for a multiple diode, multiple radial line circuit would similarly yield fundamental mode voltages $V_1, V_2, ..., V_N$ all of which are equal and in phase at the planes of terminals $T_a$. again resulting in substantially no current flow in resistive layer 12. In the presence of any spurious modes, the phases of the spurious mode voltages $V_1$ and $V_2$ or of voltages $V_1, V_2, ..., V_N$ would be randomly arranged and their amplitudes would not likely be equal. If such undesired modes were incipient, considerable current would flow through resistors 42 and 43*a***, preventing any significant build up of energy in such undesired modes.

While the invention has been described in its preferred embodiment, it is to be understood that the words which have been used are words of description rather than by limitation and that changes within the purview of the appended claims may be made without departure from the true scope and spirit of the invention in its broader aspects.

I claim:

1. A high frequency energy combining network comprising:
electrically resistive means having a peripheral surface,
first high frequency conductor means having first and second ends,
said first end being affixed in electrical current carrying relation with said resistive means,
an array of substantially sector shaped radial transmission line means electrically coupled adjacent said peripheral surface and in mutually insulated relation,
an array of active semiconductor means coupled at least one each to each of said radial transmission line means, and
means for capacity coupling said semiconductor means to said second end of said high frequency conductor means.

2. Apparatus as described in claim 1 wherein said electrically resistive means is bonded to at least one surface of a substantially symmetric dielectric substrate.

3. Apparatus as described in claim 1 wherein said active semiconductor means comprise semiconductor diode means supported by said means for capacity coupling.

4. Apparatus as described in claim 1 wherein said electrically resistive means comprises a substantially symmetric planar resistor.

5. Apparatus as described in claim 4 wherein said first high frequency conductor means is affixed substantially centrally within said planar resistor.

6. Apparatus as described in claim 4 wherein said planar resistor is adapted to carry bias currents for said semiconductor array.

7. Apparatus as described in claim 1 comprising:
coaxial transmission line means, and
capacitive coupling means,
said coaxial transmission line means supporting said capacitive coupling means in spaced high frequency energy interchanging relation adjacent said resistive means.

8. Apparatus as described in claim 7 wherein said means for capacity coupling said semiconductor means comprises:
casing means having first and second wall means each having
high frequency current carrying interior surfaces,
said first wall means having an aperture for support therewithin of said coaxial line means, said second wall having an aperture therein for accommodation of said first conductive means, third wall means for closing said second aperture and affixed in conductive relation to said second end of said first conductor means, and capacitive insulation means, said capacitive insulation means, said second wall means, and said third wall means forming a capacitive circuit for said high frequency energy.

9. Apparatus as described in claim 1 wherein each said substantially sector shaped radial transmission line means comprises a planar conductor having inner and outer arcuate boundary surfaces joined by radial boundary surfaces.

10. Apparatus as described in claim 9 wherein said array of radial transmission line means comprises a plurality of said planar conductors arranged substantially in the form of a disk.

11. Apparatus as described in claim 10 wherein:

said planar conductors are each integrally affixed in insulated relation with respect to adjacent planar conductors by insulator means, and said disk has a substantially centrally located aperture for supporting said resistive means.

* * * * *